(12) United States Patent
Yamasaki et al.

(10) Patent No.: US 9,238,696 B2
(45) Date of Patent: *Jan. 19, 2016

(54) PRODUCTION METHOD FOR POWDERED HYDROPHILIC MODIFIED POLYROTAXANE

(75) Inventors: Tomoaki Yamasaki, Hyogo (JP); Shinya Okazaki, Hyogo (JP); Hiroki Okazaki, Hyogo (JP); Shigeki Hamamoto, Hyogo (JP); Yuki Hayashi, Chiba (JP); Minoru Iwata, Chiba (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/004,839

(22) PCT Filed: Dec. 5, 2011

(86) PCT No.: PCT/JP2011/078019
§ 371 (c)(1),
(2), (4) Date: Nov. 13, 2013

(87) PCT Pub. No.: WO2012/124217
PCT Pub. Date: Sep. 20, 2012

(65) Prior Publication Data
US 2014/0066615 A1    Mar. 6, 2014

(30) Foreign Application Priority Data
Mar. 14, 2011 (JP) .................................. 2011-055503

(51) Int. Cl.
| C08L 71/02 | (2006.01) |
| C08L 5/16 | (2006.01) |
| C08B 37/16 | (2006.01) |
| C08J 3/12 | (2006.01) |

(52) U.S. Cl.
CPC ............ *C08B 37/0015* (2013.01); *C08J 3/122* (2013.01); *C08L 71/02* (2013.01); *C08J 2305/16* (2013.01)

(58) Field of Classification Search
None
See application file for complete search history.

(56) References Cited

U.S. PATENT DOCUMENTS

| 5,855,900 | A  | * | 1/1999 | Nobuhiko ..................... 424/425 |
| 6,037,387 | A  | * | 3/2000 | Yui et al. ....................... 523/112 |
| 6,100,329 | A  | * | 8/2000 | Gibson et al. ................... 525/55 |
| 6,828,378 | B2 | * | 12/2004 | Okumura et al. ............... 525/55 |
| 2001/0033868 | A1 | * | 10/2001 | Rossling et al. ............. 424/497 |
| 2005/0101624 | A1 | * | 5/2005 | Betts et al. .................... 514/291 |
| 2005/0123614 | A1 | * | 6/2005 | Kim et al. ..................... 424/489 |
| 2006/0069168 | A1 | * | 3/2006 | Tabata et al. ................ 514/772.1 |
| 2008/0097039 | A1 |   | 4/2008 | Ito et al. |
| 2009/0088546 | A1 |   | 4/2009 | Ito et al. |
| 2009/0131588 | A1 |   | 5/2009 | Ito et al. |
| 2009/0312490 | A1 |   | 12/2009 | Ito et al. |
| 2009/0312491 | A1 |   | 12/2009 | Ito et al. |
| 2010/0274002 | A1 | * | 10/2010 | Amann et al. ................ 536/103 |
| 2013/0296546 | A1 |   | 11/2013 | Yamasaki et al. |
| 2013/0296547 | A1 |   | 11/2013 | Yamasaki et al. |
| 2013/0317209 | A1 |   | 11/2013 | Yamasaki et al. |
| 2013/0331562 | A1 | * | 12/2013 | Yamasaki et al. ............... 536/46 |
| 2014/0066616 | A1 |   | 3/2014 | Yamasaki et al. |

FOREIGN PATENT DOCUMENTS

| CN | 1426424 | 6/2003 |
| CN | 1910218 | 2/2007 |
| CN | 1938367 | 3/2007 |
| EP | 1 921 105 | 5/2008 |
| EP | 1 942 163 | 7/2008 |
| EP | 1942163 | 7/2008 |
| EP | 2 653 482 | 10/2013 |
| JP | 3-237103 | 10/1991 |
| JP | 2002-508401 | 3/2002 |
| JP | 2005-272664 | 10/2005 |
| JP | 2006-316089 | 11/2006 |
| JP | 2007-063412 | 3/2007 |
| JP | 2007-092024 | 4/2007 |
| JP | 2008-310286 | 12/2008 |

(Continued)

OTHER PUBLICATIONS

Liu et al., "Solvent-Free Synthesis of Unmodified Cyclodextrin-Based Pseudopolyrotaxane and Polyrotaxane by Grinding", Polymer Journal, vol. 39, No. 1, Jan. 15, 2007, pp. 21-23.

(Continued)

*Primary Examiner* — James J. Seidleck
*Assistant Examiner* — Peter A Salamon
(74) *Attorney, Agent, or Firm* — Hamre, Schumann, Mueller & Larson, P.C.

(57) ABSTRACT

The present invention aims to provide a method of producing a powdered hydrophilic modified polyrotaxane, which enables production of a powdered hydrophilic modified polyrotaxane excellent in storage stability in an industrially advantageous way. The present invention provides a method of producing a powdered hydrophilic modified polyrotaxane, comprising: a hydrophilic modification step of preparing a solution of a hydrophilic modified polyrotaxane by modifying all or part of hydroxy groups on a cyclodextrin of a polyrotaxane with hydrophilic modifying groups, the polyrotaxane containing the cyclodextrin, a polyethylene glycol included in the cavities of the cyclodextrin molecules in a skewered manner, and a capping group that is placed at each end of the polyethylene glycol and prevents dissociation of the cyclodextrin molecules from the polyethylene glycol; and a drying step of spraying the prepared solution of the hydrophilic modified polyrotaxane and drying the solution of the hydrophilic modified polyrotaxane in a heated gas stream.

4 Claims, 1 Drawing Sheet

(56) References Cited

FOREIGN PATENT DOCUMENTS

| WO | 99/30744 | 6/1999 |
|---|---|---|
| WO | 2005/080469 | 9/2005 |

OTHER PUBLICATIONS

Fleury et al., "Synthesis and characterization of high molecular weight polyrotaxanes: towards the control over a wide range of threaded α-cyclodedextrins", Soft Matter, vol. 1, No. 5, Jan. 1, 2005, pp. 378-385.

Guo, et al., "Spray Drying (1st Edition)", pp. 191, 193-195, 1983 with a full English translation.

Pan, et al., "Modern Drying Technology, the 1st Edition", Chemical Industry Press, Sep. 30, 1998, line 1 on p. 121 to line 8 on p. 122—with a full translation.

Kagaku Daijiten Editorial Board, ed., "Kagaku Daijiten 2", Pocket Edition, $34^{th}$ Impression (1993), Kyoritsu Shuppan Co., Ltd., pp. 658-659 with a partial English translation.

Kagaku Daijiten Editorial Board, ed., "Kagaku Daijiten 8", Pocket Edition, $30^{th}$ Impression (1987), Kyoritsu Shuppan Co., Ltd., pp. 214-215 with a partial English Translation.

Topchieva, et al., "Two-phase channel Structures Based on a-Cyclodextrin-Polyethylene Glycol Inclusion Complexes", Langmuir 20:9036-9043, 2004.

Hedges AR, "Industrial Applications of Cyclodextrins", Chem Rev 98:2035-2044, 1998.

Guo, et al., "Spray Drying ($1^{st}$ edition)", pp. 1-6, 1983 with a full English translation.

Lavett, et al., "Vacuum Drying", The Journal of Industrial and Engineering Chemistry, vol. 13, No. 7, pp. 600-605, Jul. 1921.

Form PTO-892 issued in co-pending U.S. Appl. No. 14/004,849, filed Sep. 21, 2015 (1 page).

\* cited by examiner (a)
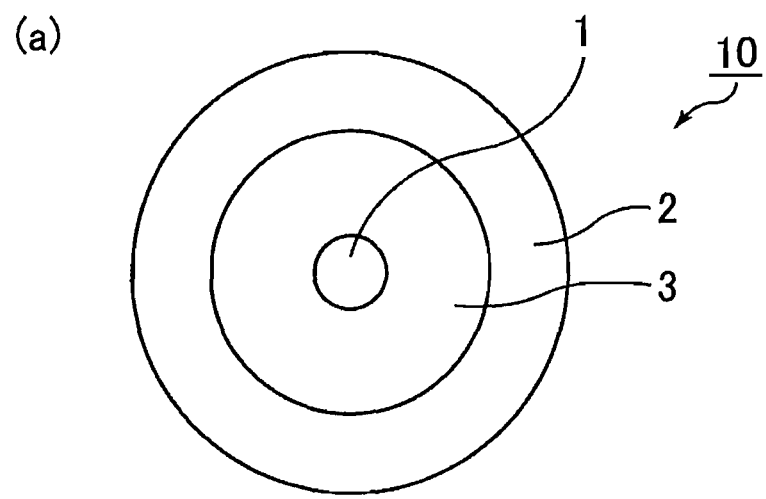
(b)
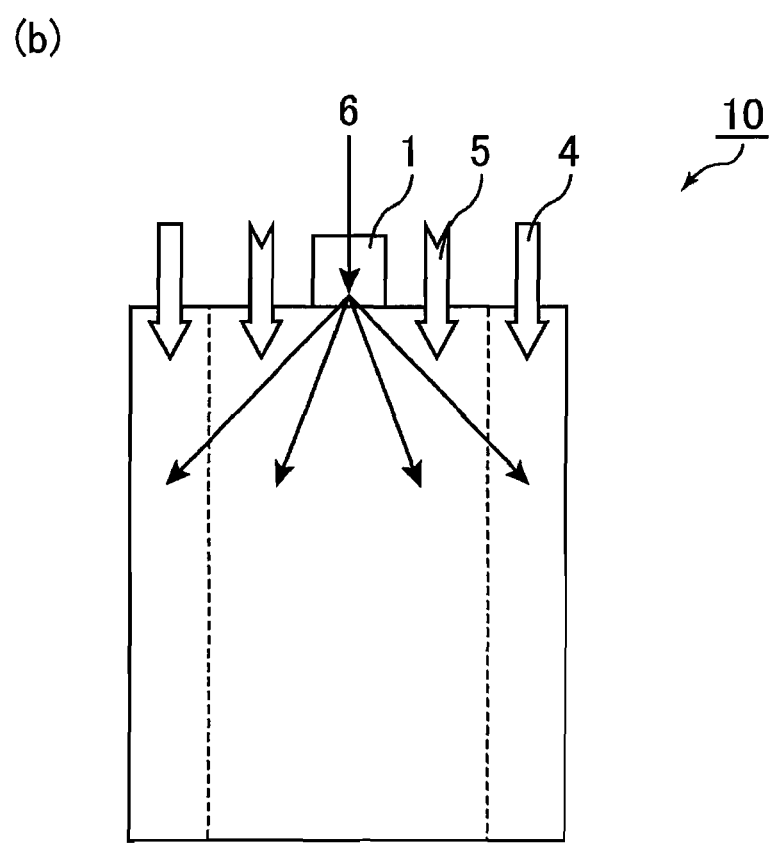

PRODUCTION METHOD FOR POWDERED HYDROPHILIC MODIFIED POLYROTAXANE

TECHNICAL FIELD

The present invention relates to a method of producing a powdered hydrophilic modified polyrotaxane.

BACKGROUND ART

"Slide-ring gels", new gels different from physical gels and chemical gels, have been developed in recent years. A compound that is used for such slide-ring gels and is drawing attention is a crosslinked polyrotaxane.

A crosslinked polyrotaxane has a structure in which linear molecules are threaded through cyclic molecules in a skewered manner and the cyclic molecules are movable along the linear molecules (has a pulley effect). The pulley effect allows the crosslinked polyrotaxane to be viscoelastic and to uniformly distribute tensile force applied thereto. The crosslinked polyrotaxane is therefore not likely to have cracks or flaws, i.e., has excellent characteristics that conventional crosslinked polymers do not have. Such a crosslinked polyrotaxane is obtainable by placing a capping group at each end of a linear molecule of pseudopolyrotaxanes and to prevent dissociation of the cyclic molecules of pseudopolyrotaxanes, and crosslinking the resulting polyrotaxanes. The pseudopolyrotaxanes have a linear molecule which is included in the cavities of the cyclic molecules in a skewered manner.

For the cyclic molecules of the polyrotaxane, cyclodextrins are favorably used. Cyclodextrins, however, contain a large number of hydroxy groups and these hydroxy groups are firmly bonded to one another by a large hydrogen bonding strength. Therefore, the resulting polyrotaxane is hardly dissolved in water, limiting the application range.

Patent Literature 1 discloses a hydrophilic modified polyrotaxane that is dissolved in water or a water-based solvent, which may extend the application range to coatings, adhesives, and the like. A hydrophilic modified polyrotaxane is typically produced by modifying the hydroxy groups on a cyclodextrin of a polyrotaxane with hydrophilic modifying groups in a solvent, thereby yielding a hydrophilic modified polyrotaxane in an aqueous solution state. This aqueous solution of the hydrophilic modified polyrotaxane may be used as it is, i.e., in a solution state without drying. When a solution of the hydrophilic modified polyrotaxane having a higher concentration than the obtained solution is required, however, a complicated process for concentration is needed. In addition, particularly if the solution of the hydrophilic modified polyrotaxane is to be given another function through a chemical modification and the solution contains water, the water in the solution may inhibit the chemical modification reaction, limiting the application range. To prevent this, Patent Literature 1 discloses a method of producing a solid hydrophilic modified polyrotaxane by freeze-drying of a solution of the hydrophilic modified polyrotaxane.

CITATION LIST

Patent Literature

Patent Literature 1: JP 2007-63412 A (Japanese Kokai Publication No 2007-63412)

SUMMARY OF INVENTION

Technical Problem

When a solution of a hydrophilic modified polyrotaxane is dried to produce a solid hydrophilic modified polyrotaxane in an industrial scale, such a freeze-drying method as disclosed in Patent Literature 1 requires a large cost for equipment and for running of the equipment. In addition, freeze-drying is not suitable for drying such a dilute solution of the hydrophilic modified polyrotaxane as disclosed in Patent Literature 1 because it takes a huge amount of time.

Furthermore, a drying method such as vacuum drying causes the resulting hydrophilic modified polyrotaxane to be aggregated. Therefore, in order to efficiently dissolve the aggregated hydrophilic modified polyrotaxane in water or a water-based solvent without lumps, a complicated process such as crushing the aggregated hydrophilic modified polyrotaxane into a powder, and adjusting the powder to have an appropriate particle size by classification and the like is required.

The present invention aims to solve these problems and provide a method of producing a powdered hydrophilic modified polyrotaxane, which enables production of a powdered hydrophilic modified polyrotaxane in an industrially advantageous way.

Solution to Problem

The present invention relates to a method of producing a powdered hydrophilic modified polyrotaxane, comprising: a hydrophilic modification step of preparing a solution of a hydrophilic modified polyrotaxane by modifying all or part of hydroxy groups on a cyclodextrin of a polyrotaxane with hydrophilic modifying groups, the polyrotaxane containing the cyclodextrin, a polyethylene glycol included in the cavities of the cyclodextrin molecules in a skewered manner, and a capping group that is placed at each end of the polyethylene glycol and prevents dissociation of the cyclodextrin molecules from the polyethylene glycol; and a drying step of spraying the prepared solution of the hydrophilic modified polyrotaxane and drying the solution of the hydrophilic modified polyrotaxane in a heated gas stream.

The present invention is described in detail below.

The present inventors found that drying methods such as vacuum drying cause aggregation in the resulting hydrophilic modified polyrotaxane, and in addition, the storage stability of the hydrophilic modified polyrotaxane may be insufficient. For example, when a hydrophilic modified polyrotaxane is produced by vacuum drying at 40° C. to lower than 100° C., by heating the solution to the boiling point of water and then drying at normal pressure, or the like, the storage stability becomes remarkably poor and decomposition tends to occur at a storage temperature of 30° C. to 40° C. This causes isolation of the cyclodextrin in which all or part of the hydroxy groups are modified with hydrophilic modifying groups (hereinafter, also referred to as modified cyclodextrin). The isolation of the modified cyclodextrin caused by decomposition of the hydrophilic modified polyrotaxane degrades the characteristics of the resulting crosslinked polyrotaxane, limiting the available range of the various applications.

The present inventors conducted intensive studies and found that, in drying a solution of a hydrophilic modified polyrotaxane, a method of spraying the solution of the hydrophilic modified polyrotaxane and drying the solution of the hydrophilic modified polyrotaxane in a heated gas stream enables production of a powdered hydrophilic modified polyrotaxane excellent in storage stability in an industrially advantageous way. Thus, the present invention was completed.

The method of producing a powdered hydrophilic modified polyrotaxane of the present invention includes a hydrophilic modification step of preparing a solution of a hydrophilic modified polyrotaxane by modifying a polyrotaxane which includes a cyclodextrin, a polyethylene glycol included in the cavities of the cyclodextrin molecules in a skewered manner, and a capping group that is placed at each end of the polyethylene glycol and prevents dissociation of the cyclodextrin molecules from the polyethylene glycol, the modification of the polyrotaxane being performed by modifying all or part of hydroxy groups on the cyclodextrin with hydrophilic modifying groups. Through the hydrophilic modification step, the polyrotaxane is formed into a hydrophilic modified polyrotaxane soluble in water or a water-based solvent.

The polyrotaxane is typically produced through the following steps: an inclusion step where a polyethylene glycol having a reactive group at each end is mixed with a cyclodextrin in an aqueous medium to form an aqueous dispersion of a pseudopolyrotaxane, the aqueous dispersion containing pseudopolyrotaxane particles in which the polyethylene glycol is included in the cavities of the cyclodextrin molecules in a skewered manner; a drying step of the aqueous dispersion of a pseudopolyrotaxane to produce a solid of the pseudopolyrotaxane; and a capping step where the pseudopolyrotaxane is reacted with a compound that contains a capping group having a group reactive with the reactive group of the solid of the pseudopolyrotaxane, which introduces the capping group to each end of the polyethylene glycol included in the cavities of the cyclodextrin molecules.

The polyethylene glycol (hereinafter, also referred to as PEG) preferably has a weight average molecular weight of 1,000 to 500,000, more preferably 10,000 to 300,000, and still more preferably 10,000 to 100,000. A weight average molecular weight of the PEG of less than 1,000 may result in poor characteristics of a crosslinked polyrotaxane in which the resulting hydrophilic modified polyrotaxane is crosslinked. A weight average molecular weight of the PEG of more than 500,000 causes too high a viscosity of the solution of the polyrotaxane produced in the hydrophilic modification step, which may inhibit uniform reaction.

The weight average molecular weight herein is a polyethylene glycol equivalent value determined through measurement by gel permeation chromatography (GPC). A column used for determination of a polyethylene glycol equivalent weight average molecular weight by GPC is, for example, TSKgel SuperAWM-H (product of TOSOH CORPORATION).

The PEG may have a reactive group at each end, and the reactive group may be introduced by a conventional method.

The reactive group can be appropriately changed depending on the capping group to be used. Examples of the reactive group include, but not particularly limited to, hydroxy groups, amino groups, carboxyl groups, and thiol groups. A carboxyl group is particularly preferred. Examples of the method of introducing a carboxyl group at each end include a method of oxidizing each end using TEMPO (2,2,6,6-tetramethyl-1-piperidinyloxy radicals) and sodium hypochlorite.

In the inclusion step, the weight ratio between the PEG and the cyclodextrin is preferably 1:2 to 1:5, more preferably 1:2.5 to 1:4.5, and still more preferably 1:3 to 1:4. A weight of the cyclodextrin of less than twice the weight of the PEG may decrease the number (i.e. inclusion amount) of cyclodextrin molecules including the PEG. A weight of the cyclodextrin of more than five times the weight of the PEG does not increase the inclusion amount further, and thus is not economical.

Examples of the cyclodextrin include α-cyclodextrin, β-cyclodextrin, γ-cyclodextrin, and derivatives of these cyclodextrins. Particularly preferred in terms of inclusion property is α-cyclodextrin. These cyclodextrins may be used alone or in combination.

Examples of the aqueous medium include water, and aqueous mixtures of water and an aqueous organic solvent such as DMF and DMSO. Particularly, water is preferred.

The only required condition for mixing the PEG and the cyclodextrin in the inclusion step is mixing them in the above aqueous medium. Preferably, the PEG and the cyclodextrin are dissolved in the aqueous medium. Specifically, the PEG and the cyclodextrin are added to the aqueous medium and this pre-mixture is typically heated to 50° C. to 100° C., preferably 60° C. to 90° C., and more preferably 70° C. to 80° C., so that the components are dissolved in the aqueous medium. This provides a substantially transparent mixed solution.

Cooling the resulting mixed solution of the PEG and the cyclodextrin precipitates pseudopolyrotaxane particles of the PEG and the cyclodextrin, resulting in a basically white aqueous dispersion of the pseudopolyrotaxane.

The mixed solution is preferably cooled to an end-point temperature of 0° C. to 30° C., more preferably 1° C. to 20° C., and still more preferably 1° C. to 15° C. An end-point temperature of the mixed solution of lower than 0° C. may freeze the aqueous dispersion of a pseudopolyrotaxane to decrease the fluidity. An end-point temperature of the mixed solution of higher than 30° C. may not sufficiently precipitate pseudopolyrotaxane particles.

The time for retaining the flowing state of the resulting aqueous dispersion of a pseudopolyrotaxane after the mixed solution is cooled to a desired temperature is typically several seconds to one week, and preferably several hours to three days.

The pseudopolyrotaxane concentration of the aqueous dispersion of a pseudopolyrotaxane (hereinafter, also referred to as a "solids concentration of the aqueous dispersion of a pseudopolyrotaxane") is preferably 5 to 25% by weight, more preferably 5 to 20% by weight, and still more preferably 10 to 20% by weight. A solids concentration of the aqueous dispersion of a pseudopolyrotaxane of lower than 5% by weight is not economical. A solids concentration of the aqueous dispersion of a pseudopolyrotaxane of higher than 25% by weight may decrease the fluidity of the aqueous dispersion of a pseudopolyrotaxane, causing difficulty in drying the dispersion.

In the drying step, the drying temperature for the aqueous dispersion of a pseudopolyrotaxane is preferably 70° C. to 200° C., more preferably 70° C. to 180° C., and still more preferably 70° C. to 170° C. A drying temperature for the aqueous dispersion of a pseudopolyrotaxane of lower than 70° C. in the drying step may cause insufficient drying. A drying temperature for the aqueous dispersion of a pseudopolyrotaxane of higher than 200° C. in the drying step may cause decomposition of the pseudopolyrotaxane, possibly decreasing the inclusion ratio which is described later.

The capping step may be carried out by a conventional method, and in terms of the reactivity and stability of chemical bonding, particularly preferred is a capping method of reacting a pseudopolyrotaxane having a carboxyl group at each end of the PEG with an adamantane amine or a salt thereof as a capping agent.

In the hydrophilic modification step, the hydroxy groups on a cyclodextrin of a polyrotaxane may be modified with hydrophilic modifying groups by a conventional method.

Specific examples of the hydrophilic modifying group include, but not particularly limited to, carboxyl groups, sulfonic acid groups, sulfuric acid ester groups, phosphoric acid ester groups, primary to tertiary amino groups, quaternary ammonium bases, and hydroxy alkyl groups. Preferred are hydroxy alkyl groups resulting from a reaction with a compound such as propylene oxide, in view of the diversity of the reaction in synthesis of a crosslinked polyrotaxane.

In the hydrophilic modification step, the hydroxy groups on a cyclodextrin of a polyrotaxane are modified with hydrophilic modifying groups by, for smooth reaction, dissolving the polyrotaxane in a solvent such as DMSO or an alkali aqueous solution and reacting the polyrotaxane with a compound having a hydrophilic modifying group. Particularly preferable solvent used in the hydrophilic modification step is an aqueous solution of sodium hydroxide.

For example, synthesis of a hydrophilic modified polyrotaxane through addition of propylene oxide is carried out as follows. A polyrotaxane is dissolved in an aqueous solution of sodium hydroxide. Propylene oxide is added thereto and the mixture is stirred for reaction at from room temperature to 50° C. for several hours to one day. Thereby, a substantially transparent aqueous solution of a hydrophilic modified polyrotaxane to which propylene oxide is added is obtained.

The concentration of the hydrophilic modified polyrotaxane in the solution of the hydrophilic modified polyrotaxane (hereinafter, also referred to as the "solids concentration of the solution of the hydrophilic modified polyrotaxane") is preferably 5 to 25% by weight, and more preferably 5 to 20% by weight, and still more preferably 5 to 15% by weight. A solids concentration of the solution of the hydrophilic modified polyrotaxane of lower than 5% by weight is not economical. A solids concentration thereof of higher than 25% by weight raises the viscosity of the solution of the hydrophilic modified polyrotaxane, which may cause difficultly in spraying the polyrotaxane in the drying step.

The present inventors also found that adding a metal chelator and/or an antioxidant to a solution of the hydrophilic modified polyrotaxane and then spraying and drying the mixture in a heated gas stream further effectively prevents decomposition of the hydrophilic modified polyrotaxane during the drying step and of the resulting dried hydrophilic modified polyrotaxane with time during storage.

Specific and preferable examples of the metal chelator include aminopolycarboxylic acid metal chelators such as ethylene diamine tetraacetic acid (EDTA), cyclohexane diamine tetraacetic acid (CDTA), nitrilotriacetic acid (NTA), triethylenetetraamine hexaacetic acid, iminodiacetic acid (IDA), diethylene triamine pentaacetic acid, N-(2-hydroxy ethyl)ethylene diamine triacetic acid, glycol ether diamine tetraacetic acid, L-glutamic acid diacetic acid, L-aspartic acid-N,N-diacetic acid, and a salt thereof. Preferable examples of the antioxidant include polyphenols such as rosmarinic acid (rosemary extract), catechin, epicatechin, gallocatechin, catechin gallate, epicatechin gallate, gallocatechin gallate, epigallocatechin gallate, epigallocatechin, tannic acid, gallotannin, ellagitannin, caffeic acid, dihydro caffeic acid, chlorogenic acid, isochlorogenic acid, gentisic acid, homogentisic acid, gallic acid, ellagic acid, rutin, quercetin, quercetagin, quercetagetin, gossypetin, anthocyanin, leucoanthocyanin, proanthocyanidin, and enocyanin.

The amount of the metal chelator is preferably 0.001 to 5% by weight, more preferably 0.005 to 2% by weight, and still more preferably 0.01 to 1% by weight, based on the weight of the hydrophilic modified polyrotaxane. The amount of the antioxidant is preferably 0.001 to 5% by weight, more preferably 0.005 to 2% by weight, and still more preferably 0.01 to 1% by weight, based on the weight of the hydrophilic modified polyrotaxane. The metal chelator or the antioxidant in an amount of less than 0.001% by weight may not effectively improve the storage stability. The metal chelator or the antioxidant in an amount of more than 5% by weight does not further improve the intended effect, and thus is not economical.

The resulting solution of the hydrophilic modified polyrotaxane is purified by a conventional purification technique such as dialysis or reprecipitation. The purified product is then dried, thereby yielding a solid of the hydrophilic modified polyrotaxane.

The method of producing a powdered hydrophilic modified polyrotaxane of the present invention includes a drying step of spraying the prepared solution of the hydrophilic modified polyrotaxane and drying the solution of the hydrophilic modified polyrotaxane in a heated gas stream.

A hydrophilic modified polyrotaxane produced by a conventional method is decomposed with time during storage. This is presumably attributed to chain of a slight amount of oxyradicals generated by heating and the like. In contrast, in the method of producing a powdered hydrophilic modified polyrotaxane of the present invention, a solution of the hydrophilic modified polyrotaxane is sprayed, and the resulting fine drops are instantly dried in a heated gas stream in a drying step. This enables to avoid excessive heating in the drying step and lead to a short time exposure to heat. This presumably prevents the generation of radicals in the drying step, and thereby significantly improves the storage stability.

Drying in a shelf vacuum dryer or the like causes the resulting hydrophilic modified polyrotaxane to stick to trays of the dryer. Such a polyrotaxane stuck to the trays is considerably hard to take off, and in addition, it becomes aggregated. Therefore, in order to efficiently dissolve the aggregated hydrophilic modified polyrotaxane in water or a water-based solvent without lumps, a complicated process such as crushing the aggregated hydrophilic modified polyrotaxane into a powder and adjusting the particles of the powder to an appropriate particle size by classification or the like is required. On the other hand, the method of producing a powdered hydrophilic modified polyrotaxane of the present invention allows direct production of a powdered hydrophilic modified polyrotaxane in the drying step, avoiding such a complicated process.

Examples of the method of spraying the solution of the hydrophilic modified polyrotaxane in the drying step include a nozzle method using a nozzle such as a pressure nozzle, a two-fluid nozzle, a four-fluid nozzle, or an ultrasonic nozzle, and a rotating disk method.

The nozzle method can be suitably used for a solution of the hydrophilic modified polyrotaxane with a low viscosity.

Examples of the spray dryer usable for the nozzle method include a nozzle atomizer spray dryer. The method employed in such a nozzle atomizer spray dryer is roughly classified into counter spraying of spraying the solution of the hydrophilic modified polyrotaxane against the hot-gas blowing direction, and parallel spraying of spraying the solution of the hydrophilic modified polyrotaxane in the same direction as the hot-gas blowing direction. The counter spraying leads to long residence time of the sprayed solution of the hydrophilic modified polyrotaxane, while the parallel spraying leads to short residence time of the sprayed solution of the hydrophilic modified polyrotaxane. With such a nozzle atomizer spray dryer, changing the nozzle size to adjust the size of drops to be sprayed allows adjustment of the particle size of the resulting powdered hydrophilic modified polyrotaxane to a desired size.

The rotating disc method can be suitably used for a solution of the hydrophilic modified polyrotaxane with a high viscosity.

Examples of the spray dryer usable for the rotating disc method include a rotary atomizer spray dryer. With such a rotary atomizer spray dryer, changing the number of rotations of the disc to adjust the size of drops to be sprayed allows adjustment of the particle size of the resulting powdered hydrophilic modified polyrotaxane to a desired size.

The gas to be blown out for the drying step can be gas such as air or nitrogen.

In the drying step, the inlet temperature of the spray dryer is preferably set to 70° C. to 200° C. and the outlet temperature of the spray dryer is preferably set to 55° C. to 105° C.

An inlet temperature of lower than 70° C. may cause insufficient drying. An inlet temperature of higher than 200° C. may decompose the hydrophilic modified polyrotaxane during drying and decrease the inclusion ratio. Even if a powdered hydrophilic modified polyrotaxane is obtained without decomposition, decomposition may occur with time during storage, causing isolation of the modified cyclodextrin molecules. The inlet temperature of the spray dryer is more preferably 70° C. to 180° C., and still more preferably 70° C. to 170° C.

An outlet temperature of the spray dryer of lower than 55° C. may cause insufficient drying. An outlet temperature of higher than 105° C. may decompose the hydrophilic modified polyrotaxane and decrease the inclusion ratio. Even if a powdered hydrophilic modified polyrotaxane is obtained without decomposition, decomposition may occur with time during storage, causing isolation of the modified cyclodextrin molecules. The outlet temperature of the spray dryer is more preferably 60° C. to 100° C., and still more preferably 70° C. to 100° C.

In the drying step, the inlet temperature of the spray dryer may be controlled by blowing out at least two different temperature hot gasses from an inlet of the spray dryer. If two different temperature hot gasses are blown out, for example, the inlet temperature of the spray dryer can be controlled by changing the flowing ratio of the two different temperature hot gasses.

The inlet temperature of the spray dryer is conveniently computable by the following formula.

(Inlet temperature)=[temperature of higher temperature hot gas×(flow rate of higher temperature hot gas/total flow rate of hot gases)]+[temperature of lower temperature hot gas×(flow rate of lower temperature hot gas/total flow rate of hot gases)]

Preferably, in the drying step, the solution of the hydrophilic modified polyrotaxane is sprayed in a first higher temperature hot gas, and the resulting mostly dried particles of the solution are then brought into contact with a second lower temperature hot gas for further drying.

FIG. 1 illustrates an example in which at least two different temperature hot gasses are blown out from an inlet of a spray dryer in the drying step of the present invention. FIG. 1(a) is a schematic top view of the inlet of the spray dryer. FIG. 1(b) is a schematic side view of the inlet of the spray dryer. As illustrated in FIG. 1, an inlet 10 of a spray dryer has a cylinder shape and a spray nozzle 1 is disposed at the center of the circle of the top of the cylinder. A solution 6 of the hydrophilic modified polyrotaxane is sprayed in a conical pattern from the spray nozzle 1. Here, a higher temperature hot gas is blown out from the center portion of the inlet of the cylinder (a higher temperature hot gas blowing portion 3) in a higher temperature hot gas blowing direction 5, and a lower temperature hot gas is blown out from the periphery portion (a lower temperature hot gas blowing portion 2) in a lower temperature hot gas blowing direction 4. Thus, the solution is dried.

The pressure in the dryer system in the drying step is not particularly limited, but is typically a pressure near an atmospheric pressure. Vacuum drying is also possible. Drying is preferably performed under a pressure equal to or lower than an atmospheric pressure.

The residence time of the sprayed solution of the hydrophilic modified polyrotaxane is typically several seconds to several minutes, and for suppression of isolation of modified cyclodextrin molecules, it is preferably three minutes or shorter, and more preferably two minutes or shorter. Too short a residence time of the sprayed solution of the hydrophilic modified polyrotaxane leads to insufficient drying.

The diameter of the drops of the solution of the hydrophilic modified polyrotaxane to be sprayed is preferably 1 to 2,000 µm, and more preferably 5 to 500 µm. A diameter of the drops of smaller than 1 µm may cause the drops to be blown out together with the gas, decreasing the drying yield. A diameter of the drops of larger than 2,000 µm may lead to a small total surface area of the whole drops, decreasing the drying speed.

In the method of producing a powdered hydrophilic modified polyrotaxane of the present invention, the volume average particle size of the resulting powdered hydrophilic modified polyrotaxane is preferably 1 to 1,000 µm, more preferably 5 to 500 µm, and still more preferably 10 to 100 µm. A volume average particle size of the powdered hydrophilic modified polyrotaxane of smaller than 1 µm may cause the drops to be blown out together with the gas, thereby decreasing the drying yield. A volume average particle size of the powdered hydrophilic modified polyrotaxane of larger than 1,000 µm tends to cause insufficient drying and thereby the particles may adhere to the dryer. In addition, the powdered hydrophilic modified polyrotaxane with such a volume average particle size may take a long time when dissolved.

The volume average particle size herein can be analyzed using a laser diffraction particle size analyzer.

According to the method of producing a powdered hydrophilic modified polyrotaxane of the present invention, the inclusion ratio of the resulting powdered hydrophilic modified polyrotaxane can be 6 to 60%. An inclusion ratio of lower than 6% may not give a sufficient pulley effect to the resulting crosslinked hydrophilic modified polyrotaxane obtained by crosslinking the powdered hydrophilic modified polyrotaxane. An inclusion ratio of higher than 60% may result in excessively dense arrangement of modified cyclodextrin molecules, which are cyclic molecules, so that the mobility of the modified cyclodextrin molecules decreases. In order to give an appropriate mobility and a higher inclusion ratio to the modified cyclodextrin molecules, the inclusion ratio is preferably 15 to 40%, and more preferably 20 to 30%.

The inclusion ratio herein refers to a ratio of the inclusion amount of cyclodextrin molecules including a PEG to the maximum inclusion amount of the cyclodextrin molecules for a PEG. The inclusion ratio is optionally controllable by changing the mixing ratio of the PEG to the cyclodextrin or the kind of aqueous medium. The maximum inclusion amount refers to the number of cyclodextrin molecules in the case of the close-packed state in which one cyclodextrin molecule includes two repeating units of the PEG.

The inclusion ratio can be measured by $^1$H-NMR. Specifically, the inclusion ratio can be calculated by dissolving the polyrotaxane in DMSO-$d_6$, subjecting the solution to measurement using an NMR measuring device (product of Varian Technologies Japan Ltd., "VARIAN Mercury-400BB"), and comparing the integrated value of cyclodextrin at 4 to 6 ppm and the integrated value of cyclodextrin and PEG at 3 to 4 ppm. The hydrophilic modified polyrotaxane is produced by modifying the hydroxy groups on a cyclodextrin of a polyrotaxane with hydrophilic modifying groups. Therefore, the inclusion ratio of the hydrophilic modified polyrotaxane is the same as the inclusion ratio of the polyrotaxane.

When the maximum number of the modifiable hydroxy groups of a cyclodextrin of a polyrotaxane is 1, the degree of modification of the resulting powdered hydrophilic modified polyrotaxane by the method of producing a powdered hydrophilic modified polyrotaxane of the present invention is preferably 0.1 or more, more preferably 0.2 or more, and still more preferably 0.4 or more. A degree of modification of the powdered hydrophilic modified polyrotaxane of lower than 0.1 gives insufficient solubility to water or a water-based solvent, possibly generating fine insoluble matters.

The maximum number of the modifiable hydroxy groups of a cyclodextrin herein refers to the number of all the hydroxy groups included in the polyrotaxane before modification. The degree of modification herein refers to the ratio of the number of modified hydroxy groups to the number of all the hydroxy groups. The degree of modification of the powdered hydrophilic modified polyrotaxane can be calculated by dissolving a solution of the powdered hydrophilic modified polyrotaxane in DMSO-$d_6$, subjecting the solution to measurement using an NMR measuring device (product of Varian Technologies Japan Ltd., "VARIAN Mercury-400BB"), and comparing the integrated value of hydroxy propyl groups at 0.7 to 1.3 ppm and the integrated value of cyclodextrin and hydroxy propyl groups at 4.2 to 6.2 ppm.

Advantageous Effects of Invention

The present invention provides a method of producing a powdered hydrophilic modified polyrotaxane, which enables production of a powdered hydrophilic modified polyrotaxane excellent in storage stability in an industrially advantageous way.

BRIEF DESCRIPTION OF DRAWINGS

FIG. 1 illustrates an example in which at least two different temperature hot gasses are blown out from an inlet of a spray dryer in the drying step of the present invention. FIG. 1(a) is a schematic top view of the inlet of the spray dryer. FIG. 1(b) is a schematic side view of the inlet of the spray dryer.

DESCRIPTION OF EMBODIMENTS

The present invention is described below in more detail based on examples which, however, are not intended to limit the scope of the present invention. In the following, a PEG having a carboxyl group at each end was produced by oxidation of a PEG in accordance with the method described in WO 05/052026 A.

EXAMPLE 1

(1) Preparation of PEG Having Carboxyl Group at Each End Molecule by TEMPO Oxidation of PEG In a 200-L reaction vessel, 100 L of water was charged, and 10 kg of a PEG (weight average molecular weight: 35,000), 100 g of TEMPO (2,2,6,6-tetramethyl-1-piperidinyloxy radicals), and 1 kg of sodium bromide were dissolved therein. To the solution was added 5 L of a commercially available aqueous solution of sodium hypochlorite (effective chlorine concentration: 5%), and the resulting mixture was stirred at room temperature for 30 minutes. An amount of 5 L of ethanol was added to decompose the excess of sodium hypochlorite and terminate the reaction. Extraction separation using 50 L of methylene chloride was repeated three times to extract the components excepting mineral salts, and then methylene chloride was evaporated under vacuum. Thereby, 10 kg of a PEG having a carboxyl group at each end was obtained.

(2) Preparation of Aqueous Dispersion of Pseudopolyrotaxane Using α-Cyclodextrin and PEG Having Carboxyl Group at Each End An amount of 325 L of water was added to 10 kg of the prepared PEG having a carboxyl group at each end. Then, 40 kg of α-cyclodextrin was added to the mixture and the resulting mixture was heated to 70° C. for dissolution. The solution was cooled to 4° C. while being stirred, whereby a milky aqueous dispersion of a pseudopolyrotaxane was precipitated.

(3) Drying of Aqueous Dispersion of Pseudopolyrotaxane

Using a nozzle atomizer spray drier (product of Ohkawara Kakohki Co., Ltd., "L-8"), 400 kg of the prepared aqueous dispersion of a pseudopolyrotaxane was spray-dried at an inlet temperature of the spray dryer of 165° C. and an outlet temperature of 90° C. under ordinary pressure. Thereby, 50 kg of a powdered pseudopolyrotaxane was obtained.

(4) Capping of Pseudopolyrotaxane Using Adamantane Amine and BOP Reagent Reaction System In a 500-L reaction vessel, 500 g of adamantane amine was dissolved in 170 L of dimethyl formamide (DMF) at room temperature. Then, 50 kg of the powdered pseudopolyrotaxane was added to the vessel and the mixture was stirred. Subsequently, a solution in which 1.3 kg of a BOP reagent (benzotriazol-1-yl-oxy-tris(dimethylamino)phosphonium hexafluorophosphate) was dissolved in 80 L of DMF was added to the vessel, and the mixture was stirred. To the vessel was further added a solution in which 500 mL of diisopropylethylamine was dissolved in 80 L of DMF, and the mixture was stirred at normal temperature overnight.

The resulting mixture was filtered. To the residue was added 300 L of hot water (70° C.), the mixture was stirred well, and the resulting mixture was filtered. This process was repeated three times. The resulting residue was vacuum-dried, and thereby 30 kg of polyrotaxane was purified in the end.

(5) Hydroxypropylation of Hydroxy Groups of Cyclodextrin

To a 500-L reaction vessel, 180 L of water, 10 kg of sodium hydroxide, and 30 kg of the purified polyrotaxane were dissolved. To the solution was added 60 kg of propylene oxide and the mixture was stirred at room temperature under a nitrogen atmosphere overnight. The resulting mixture was neutralized with a 1 mol/L aqueous solution of HCl. Then, the mixture was diluted with water for purification, thereby yielding 400 kg of an aqueous solution of the hydrophilic modified polyrotaxane with a solids concentration of 10% by weight.

(6) Drying of Aqueous Solution of Hydrophilic Modified Polyrotaxane

A 170° C. hot gas was blown out from the inlet of a nozzle atomizer spray dryer (product of Ohkawara Kakohki Co., Ltd.), and 100 kg of the prepared aqueous solution of the hydrophilic modified polyrotaxane was spray-dried at an inlet temperature of 170° C. and an outlet temperature of 105° C. Thereby, 9.3 kg of a powdered hydrophilic modified polyrotaxane (drying loss: 1% by weight) with a volume average particle diameter of 35 μm was obtained. The resulting powdered hydrophilic modified polyrotaxane had an inclusion ratio of 23%, a free modified cyclodextrin content of 0.1% by weight, and a degree of modification of 0.5.

The free modified cyclodextrin content refers to a weight percent ratio of the free modified cyclodextrin content to the powdered hydrophilic modified polyrotaxane, and can be calculated from the following formula.

Free modified cyclodextrin content [%]=(weight of free modified cyclodextrin molecules in powdered hydrophilic modified polyrotaxane/weight of powdered hydrophilic modified polyrotaxane)×100

The weight of the free modified cyclodextrin molecules in the powdered hydrophilic modified polyrotaxane was determined by the absolute calibration method of liquid chromatograph analysis.

The determination was carried out using a high-performance liquid chromatograph (product of Waters Corporation, "Alliance 2695").

EXAMPLE 2

A powdered hydrophilic modified polyrotaxane in an amount of 9.5 kg (drying loss: 1.5% by weight) with a volume average particle diameter of 42 μm was obtained in the same manner as in Example 1, except that the aqueous solution of the hydrophilic modified polyrotaxane was dried at an inlet temperature of the nozzle atomizer spray dryer of 150° C. and an outlet temperature of 90° C. According to the same measurements as in Example 1, the resulting powdered hydrophilic modified polyrotaxane had an inclusion ratio of 23%, a free modified cyclodextrin content of 0.1% by weight, and a degree of modification of 0.5.

EXAMPLE 3

A powdered hydrophilic modified polyrotaxane in an amount of 9.4 kg (drying loss: 5% by weight) with a volume average particle diameter of 26 μm was obtained in the same manner as in Example 1, except that the aqueous solution of the hydrophilic modified polyrotaxane was dried at an inlet temperature of the nozzle atomizer spray dryer of 110° C. and an outlet temperature of 70° C.

According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

EXAMPLE 4

A powdered hydrophilic modified polyrotaxane in an amount of 9.4 kg (drying loss: 0.8% by weight) with a volume average particle diameter of 33 μm was obtained in the same manner as in Example 1, except that the aqueous solution of the hydrophilic modified polyrotaxane was dried by blowing out hot gases at 190° C. and at 120° C. from the inlet of the nozzle atomizer spray dryer in the same manner as in FIG. 1, and setting the inlet temperature of the spray dryer at 170° C. and the outlet temperature at 105° C. According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

EXAMPLE 5

A powdered hydrophilic modified polyrotaxane in an amount of 9.4 kg (drying loss: 2% by weight) with a volume average particle diameter of 29 μm was obtained in the same manner as in Example 1, except that the aqueous solution of the hydrophilic modified polyrotaxane was dried by blowing out hot gases of 160° C. and of 30° C. from the inlet of the nozzle atomizer spray dryer in the same manner as in FIG. 1, and setting the inlet temperature at 90° C. and the outlet temperature at 55° C. According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

EXAMPLE 6

A powdered hydrophilic modified polyrotaxane in an amount of 9.5 kg (drying loss: 1% by weight) with a volume average particle diameter of 35 μm was obtained in the same manner as in Example 1, except that, in drying the aqueous solution of the hydrophilic modified polyrotaxane, rosmarinic acid (rosemary extract, product of Mitsubishi-Kagaku Foods Corporation, "RM-21 Base") in an amount of 0.01% by weight based on the weight of the hydrophilic modified polyrotaxane was added before spray-drying. According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

EXAMPLE 7

A powdered hydrophilic modified polyrotaxane in an amount of 9.5 kg (drying loss: 1% by weight) with a volume average particle diameter of 35 μm was obtained in the same manner as in Example 1, except that, in drying the aqueous solution of the hydrophilic modified polyrotaxane, gallic acid in an amount of 0.01% by weight based on the weight of the hydrophilic modified polyrotaxane was added before spray-drying. According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

EXAMPLE 8

A powdered hydrophilic modified polyrotaxane in an amount of 9.5 kg (drying loss: 1% by weight) with a volume average particle diameter of 35 μm was obtained in the same manner as in Example 1, except that, in drying the aqueous solution of the hydrophilic modified polyrotaxane, EDTA in an amount of 0.1% by weight based on the weight of the hydrophilic modified polyrotaxane was added before spray-drying. According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

EXAMPLE 9

A powdered hydrophilic modified polyrotaxane in an amount of 9.5 kg (drying loss: 1% by weight) with a volume average particle diameter of 35 μm was obtained in the same manner as in Example 1, except that, in drying the aqueous solution of the hydrophilic modified polyrotaxane, diethylene triamine pentaacetic acid in an amount of 0.1% by weight based on the weight of the hydrophilic modified polyrotaxane was added before spray-drying. According to the same measurements as in Example 1, the resulting powdered hydrophilic modified polyrotaxane had an inclusion ratio of 23% and no free modified cyclodextrin was detected. The degree of modification of the powdered hydrophilic modified polyrotaxane was 0.5.

COMPARATIVE EXAMPLE 1

An aggregated hydrophilic modified polyrotaxane in an amount of 95 g (drying loss: 5% by weight) was obtained in the same manner as in Example 1, except that, in drying the aqueous solution of the hydrophilic modified polyrotaxane, 1 kg of the aqueous solution of the hydrophilic modified polyrotaxane was freeze-dried (dried at −10° C. to 20° C. for 48 hours). According to the same measurements as in Example 1, the resulting aggregated hydrophilic modified polyrotaxane had an inclusion ratio of 23% and a free modified cyclodextrin content of 0.1% by weight. The degree of modification of the aggregated hydrophilic modified polyrotaxane was 0.5.

COMPARATIVE EXAMPLE 2

An aggregated hydrophilic modified polyrotaxane in an amount of 94 g (drying loss: 4% by weight) was obtained in the same manner as in Example 1, except that, in drying the aqueous solution of the hydrophilic modified polyrotaxane, 1 kg of the aqueous solution of the hydrophilic modified polyrotaxane was vacuum-dried at 20° C. for 96 hours using a vacuum dryer. According to the same measurements as in Example 1, the resulting aggregated hydrophilic modified polyrotaxane had an inclusion ratio of 23%, a free modified cyclodextrin content of 1.5% by weight, and a degree of modification of 0.5.

COMPARATIVE EXAMPLE 3

An aggregated hydrophilic modified polyrotaxane in an amount of 94 g (drying loss: 3% by weight) was obtained in the same manner as in Example 1, except that, in drying the aqueous solution of the hydrophilic modified polyrotaxane, 1 kg of the aqueous solution of the hydrophilic modified polyrotaxane was vacuum-dried at 60° C. for 48 hours using a vacuum dryer. According to the same measurements as in Example 1, the resulting aggregated hydrophilic modified polyrotaxane had an inclusion ratio of 23%, a free modified cyclodextrin content of 2% by weight, and a degree of modification of 0.5.

COMPARATIVE EXAMPLE 4

An aggregated hydrophilic modified polyrotaxane in an amount of 94 g (drying loss: 2% by weight) was obtained in the same manner as in Example 1, except that, in drying the aqueous solution of the hydrophilic modified polyrotaxane, 1 kg of the aqueous solution of the hydrophilic modified polyrotaxane was dried at 60° C. for 24 hours under an atmospheric pressure in a hot-gas dryer. According to the same measurements as in Example 1, the resulting aggregated hydrophilic modified polyrotaxane had an inclusion ratio of 23%, a free modified cyclodextrin content of 48% by weight, and a degree of modification of 0.5.

<Evaluation>

Each powdered or aggregated hydrophilic modified polyrotaxane obtained in the examples and comparative examples was stored in a 40° C. thermostatic bath. The free modified cyclodextrin content was measured on the 30th and 120th days by a high-performance liquid chromatograph (product of Waters Corporation, "Alliance 2695"). Table 1 shows the results and the values measured immediately after the production.

TABLE 1

|  | Immediately after production | Day 30 | Day 120 |
|---|---|---|---|
| Example 1 | 0.1% by weight | 3% by weight | 9% by weight |
| Example 2 | 0.1% by weight | 3% by weight | 7% by weight |
| Example 3 | Not detected | 1.7% by weight | 3% by weight |
| Example 4 | Not detected | 2% by weight | 4% by weight |
| Example 5 | Not detected | 0.9% by weight | 2% by weight |
| Example 6 | Not detected | Not detected | 1% by weight |
| Example 7 | Not detected | Not detected | 1% by weight |
| Example 8 | Not detected | 0.7% by weight | 1% by weight |
| Example 9 | Not detected | 0.5% by weight | 1% by weight |
| Comparative Example 1 | 0.1% by weight | 3% by weight | 11% by weight |
| Comparative Example 2 | 1.5% by weight | 8% by weight | 17% by weight |
| Comparative Example 3 | 2% by weight | 22% by weight | 42% by weight |
| Comparative Example 4 | 48% by weight | 85% by weight | 90% by weight |

INDUSTRIAL APPLICABILITY

The present invention provides a method of producing a powdered hydrophilic modified polyrotaxane, which enables production of a powdered hydrophilic modified polyrotaxane excellent in storage stability in an industrially advantageous way.

REFERENCE SIGNS LIST

1 Spray nozzle for solution of the hydrophilic modified polyrotaxane
2 Lower temperature hot gas blowing portion
3 Higher temperature hot gas blowing portion
4 Lower temperature hot gas blowing direction
5 Higher temperature hot gas blowing direction
6 Solution of hydrophilic modified polyrotaxane
10 Inlet of spray dryer

The invention claimed is:
1. A method of producing a powdered hydrophilic modified polyrotaxane, comprising:
   a hydrophilic modification step of preparing a solution comprising a hydrophilic modified polyrotaxane that is formed by modifying all or part of hydroxyl groups on a cyclodextrin included in a polyrotaxane having hydrophilic modifying groups, a polyethylene glycol included in cavities of molecules of the cyclodextrin in a skewered manner, and a capping group that is placed at an each end of the polyethylene glycol and prevents dissociation of the cyclodextrin molecules from the polyethylene glycol; and a drying step of spraying the prepared solution of the hydrophilic modified polyrotaxane and drying the solution of the hydrophilic modified polyrotaxane in a heated gas stream, wherein the drying step is carried out in a spray dryer having an inlet temperature of the spray dryer in a range from 70° C. to 200° C. and an outlet temperature in a range from 55° C. to 105° C.

2. The method of producing a powdered hydrophilic modified polyrotaxane according to claim 1, wherein the polyethylene glycol has a weight average molecular weight of 1,000 to 500,000.

3. The method of producing a powdered hydrophilic modified polyrotaxane according to claim 1, wherein the drying step is carried out by blowing out at least two hot gasses having a temperature different from each other, from an inlet of the spray dryer.

4. The method of producing a powdered hydrophilic modified polyrotaxane according to the claim 1, wherein pressure in a dryer system in the drying step is equal to or lower than an atmospheric pressure.

* * * * *